(12) United States Patent
Cavalieri et al.

(10) Patent No.: US 8,962,763 B2
(45) Date of Patent: Feb. 24, 2015

(54) POLYOLEFINIC COMPOSITIONS FOR INJECTION-MOULDED DRAINAGE SYSTEMS

(75) Inventors: Claudio Cavalieri, Ferrara (IT); Monica Galvan, Maddalena (IT); Roberto Pantaleoni, Ferrara (IT); Enrico Beccarini, Ferrara (IT); Francesca Tisi, Rovigo (IT); Werner Rothhöft, Liederbach am Taunus (DE)

(73) Assignee: Basell Poliolefine Italia S.r.l., Milan (IT)

( * ) Notice: Subject to any disclaimer, the term of this patent is extended or adjusted under 35 U.S.C. 154(b) by 207 days.

(21) Appl. No.: 13/517,040

(22) PCT Filed: Dec. 14, 2010

(86) PCT No.: PCT/EP2010/069582
§ 371 (c)(1),
(2), (4) Date: Aug. 2, 2012

(87) PCT Pub. No.: WO2011/076611
PCT Pub. Date: Jun. 30, 2011

(65) Prior Publication Data
US 2012/0296039 A1 Nov. 22, 2012

Related U.S. Application Data

(60) Provisional application No. 61/336,142, filed on Jan. 15, 2010.

(30) Foreign Application Priority Data

Dec. 23, 2009 (IT) ................................ FE2009A0015
Nov. 19, 2010 (EP) ..................................... 10191886

(51) Int. Cl.
| | | |
|---|---|---|
| C08L 23/08 | (2006.01) | |
| C08L 23/12 | (2006.01) | |
| C08L 23/14 | (2006.01) | |
| C08L 23/20 | (2006.01) | |
| C08L 23/10 | (2006.01) | |
| C08L 23/16 | (2006.01) | |

(52) U.S. Cl.
CPC ................ C08L 23/10 (2013.01); C08L 23/14 (2013.01); *C08L 23/0815* (2013.01); *C08L 23/16* (2013.01); *C08L 2203/18* (2013.01); *C08L 2205/03* (2013.01)
USPC ............. 525/240; 525/53; 525/191; 525/262; 526/65

(58) Field of Classification Search
CPC ......... C08L 23/04; C08L 23/06; C08L 23/08; C08L 23/10; C08L 23/12; C08L 23/14; C08L 23/142; C08L 23/16; C08L 23/18; C08L 23/20
USPC ....................... 525/53, 191, 240, 262; 526/65
See application file for complete search history.

(56) References Cited

U.S. PATENT DOCUMENTS

| | | |
|---|---|---|
| 4,298,718 A | 11/1981 | Mayr et al. |
| 4,399,054 A | 8/1983 | Ferraris et al. |
| 4,469,648 A | 9/1984 | Ferraris |
| 4,472,524 A | 9/1984 | Albizzati |
| 4,495,338 A | 1/1985 | Mayr et al. |
| 4,522,930 A | 6/1985 | Albizzati et al. |
| 4,582,878 A * | 4/1986 | Chiba et al. .................. 525/268 |
| 2007/0203298 A1 | 8/2007 | Massari |
| 2008/0097036 A1 | 4/2008 | Blenke et al. |
| 2009/0253868 A1* | 10/2009 | Massari et al. ................ 525/240 |

FOREIGN PATENT DOCUMENTS

| | | |
|---|---|---|
| CN | 101180357 A | 5/2008 |
| CN | 101184609 A | 5/2008 |
| EP | 0017296 | 10/1980 |
| EP | 0045977 | 8/1981 |
| EP | 0361493 | 4/1990 |
| EP | 0728769 | 8/1996 |
| EP | 1260640 | 11/2002 |
| EP | 1607534 | 12/2005 |
| EP | 1607534 A1 * | 12/2005 |
| EP | 2459642 | 2/2011 |
| EP | 2459643 | 2/2011 |
| WO | WO-00/63261 | 10/2000 |
| WO | WO-01/57099 | 8/2001 |
| WO | WO-2004/087807 | 10/2004 |
| WO | WO-2006/067023 | 6/2006 |
| WO | WO-2006/125720 | 11/2006 |
| WO | WO 2006/125720 * | 11/2006 |

OTHER PUBLICATIONS

Priority application (Italy) FE2009A000015, Dec. 2009, retrieved from PCT application file.*

(Continued)

*Primary Examiner* — Roberto Rabago

(57) ABSTRACT

A polypropylene composition for injection-molded drainage systems comprising 78-84 wt % of a crystalline propylene polymer, 8 to less than 13 wt % of an elastomeric copolymer and 8 to less than 13 wt % of polyethylene. The said composition exhibits a flexural modulus value higher than 1400 MPa, a melt flow rate (MFR), determined according to ISO method 1133 (230° C. and 2.16 kg), of from 1.5 to 5.0 g/10 min, and a value of Izod impact resistance at 0° C. of more than 6 kJ/m² according to ISO method 180/1A.

8 Claims, No Drawings

(56) References Cited

OTHER PUBLICATIONS

Priority application (EP) 10191886.0, Nov. 2010, retrieved from PCT application file.*
Chujo, R et al., "Two-site model analysis of 13C n.m.r. of polypropylene polymerized by . . . ", Polymer, vol. 35, No. 2 1994, 339.
Inoue, Y. et al., "Studies of the stereospecific polymerization mechanism of propylene by a modified . . . ", Polymer, vol. 25, Nov. 1984, 1640.

* cited by examiner

POLYOLEFINIC COMPOSITIONS FOR INJECTION-MOULDED DRAINAGE SYSTEMS

This application is the U.S. national phase of International Application PCT/EP2010/069582, filed Dec. 14, 2010, claiming priority to Italian Application FE2009A000015 filed Dec. 23, 2009, European Application 10191886.0 filed Nov. 19, 2010, and the benefit under 35 U.S.C. 119(e) of U.S. Provisional Application No. 61/336,142, filed Jan. 15, 2010; the disclosures of International Application PCT/EP2010/069582, Italian Application FE2009A000015, European Application 10191886.0 and U.S. Provisional Application No. 61/336,142, each as filed, are incorporated herein by reference.

The present invention relates to polyolefin compositions typically used in articles prepared by injection moulding, such as sewage and underground drainage systems and related products. Specifically, the present invention can be used for injection-moulded infiltration units used in underground water management systems. These water management systems allow for temporary water storage and are capable of limiting the outflow in case of heavy rainfalls, or as an alternative for domestic drains to allow water, e.g. stormwater, infiltrate into the soil. Examples of such injection-moulded infiltration units are disclosed, for instance, in patent publications EP-A1-1260640 and EP-A1-1607534.

Polyolefin compositions suitable for these applications must show high thermo-oxidative stability as well as showing sufficient flow properties, high flexural modulus, good impact strength and long-term creep resistance.

As is known, the isotactic polypropylene, though being endowed with an exceptional combination of excellent properties, is affected by the drawback of possessing an insufficient impact resistance at relatively low temperatures.

According to the teaching of the prior art, it is possible to obviate the said drawback, without sensibly affecting the other polymer properties, by properly adding rubbers and polyethylene to the polypropylene.

WO-A1-2006/125720 relates to a polypropylene composition comprising (percent by weight):

a) 65-77%, of a crystalline propylene polymer having an amount of isotactic pentads (mmmm), measured by $^{13}$C-MNR on the fraction insoluble in xylene at 25° C., higher than 97.5 molar %;

b) 8 to less than 13%, of an elastomeric copolymer of ethylene and propylene, the copolymer having an amount of recurring units deriving from ethylene ranging from 30 to 70%, and being partially soluble in xylene at ambient temperature; the polymer fraction soluble in xylene at ambient temperature having an intrinsic viscosity value ranging from 2 to 4 dl/g; and c) 10-23%, of polyethylene having an intrinsic viscosity value ranging from 1.5 to 4 dl/g and optionally containing recurring units derived from propylene in amounts lower than 10%. The composition typically has a value of melt flow rate ranging from 0.50 to 10 g/10 min and a flexural modulus of at least 1300 MPa, preferably higher than 1350 MPa, such as from 1400 to 1600 MPa. In the two working examples included in the description, such compositions show a flexural modulus of 1370 and 1420 MPa, respectively. Typically, said composition has a content of component b) plus component c) of at least 18 wt %, preferably higher than 25 wt %.

WO-A1-2006/067023 relates to a polypropylene composition comprising (percent by weight):

a) 50-77%, of a crystalline propylene polymer having an amount of isotactic pentads (mmmm), measured by $^{13}$CNMR on the fraction insoluble in xylene at 25° C., higher than 97.5 molar % and a polydispersity index ranging from 4 to 10;

b) 13-28%, of an elastomeric copolymer of ethylene and propylene, the copolymer having an amount of recurring units deriving from ethylene ranging from 30 to 70%, being partially soluble in xylene at ambient temperature, the polymer fraction soluble in xylene at ambient temperature having an intrinsic viscosity value ranging from 2 to 4 dl/g; and c) 10-22%, preferably 10 to 20%, of polyethylene having an intrinsic viscosity value ranging from 1 to 3 dl/g and optionally containing recurring units deriving from propylene in amounts up to less than 10%.

The composition typically has a value of melt flow rate ranging from 10 to 30 g/10 min.

The composition typically has a content of component b) plus component c) of at least 25 wt %.

European patent application No. 09167019.0 shows a polymer composition comprising (percent by weight):

a) 70-84%, preferably 74 to 81%, of a crystalline propylene polymer having an amount of isotactic pentads (mmmm), measured by $^{13}$C-MNR on the fraction insoluble in xylene at 25° C., higher than 97.5 molar %;

b) 8 to 15%, preferably 9 to 13%, of an elastomeric copolymer of ethylene and propylene, the copolymer having an amount of recurring units deriving from ethylene ranging from 25 to 50 wt %, preferably from 30 to 42 wt %, more preferably from 35 to 40 wt % and being partially soluble in xylene at room temperature; the polymer fraction soluble in xylene at room temperature having an intrinsic viscosity value ranging from 2.5 to 3.5 dl/g; and c) 8-15%, preferably 10 to 13%, of ethylene homopolymer having an intrinsic viscosity value ranging from 1.2 to 3.5 dl/g, preferably from 2 to 3.5 dl/g, said composition having a value of melt flow rate ranging from 55 to 90 g/10 min.

European patent application No. 09167003.4 shows a polymer composition comprising (percent by weight):

a) 57%-74%, preferably 62% to 71%, of a crystalline propylene polymer having an amount of isotactic pentads (mmmm), measured by $^{13}$C-MNR on the fraction insoluble in xylene at 25° C., higher than 97.5 molar % and a polydispersity index ranging from 5 to 10;

b) 8 to 15%, preferably 9 to 12%, of an elastomeric copolymer of ethylene and propylene, the copolymer having an amount of recurring units deriving from ethylene ranging from 30 to 50 wt %, preferably 40 to 48 wt %, and being partially soluble in xylene at ambient temperature; the polymer fraction soluble in xylene at ambient temperature having an intrinsic viscosity value ranging from 2.5 to 3.5 dl/g; preferably from 2.5 and 3.0 and c) 18-28%, preferably 20 to 25%, of ethylene homopolymer having an intrinsic viscosity value ranging from 1.5 to 4 dl/g;

said composition having a value of melt flow rate ranging from 35 to 60 g/10 min.

Even though prior art compositions already exhibit a good balance of properties, the applicant found that it is possible to further optimize their properties in view of injection moulding applications, especially for the manufacture of injection-moulded rainwater regulating devices.

It has now surprisingly been found that it is possible to obtain polypropylene compositions endowed with an improved balance of high thermo-oxidative stability, sufficient flow properties, good creep resistance, high flexural modulus and good impact strength. The said balance of properties is achieved by producing a polypropylene composition having specific polymer components exhibiting specific characteristics and in specific ratios. Thus, an embodiment of the present invention consists of a polypropylene composition comprising (percent by weight):

a) 78-84%, preferably 78 to 82%, of a crystalline propylene polymer having an amount of isotactic pentads (mmmm), measured by $^{13}$C-MNR on the fraction insoluble in xylene at 25° C., higher than 97.5 molar % and a polydispersity index ranging from 3 to 8;

b) 8 to less than 13%, preferably 9 to less than 12%, of an elastomeric copolymer of ethylene and propylene, the copolymer having an amount of recurring units deriving from ethylene ranging from 30 to 70%, preferably 35 to 60%, and being partially soluble in xylene at ambient temperature; the polymer fraction soluble in xylene at ambient temperature having an intrinsic viscosity value ranging from 2 to 4 dl/g; and c) 8 to less than 13%, preferably 9 to less than 12%, of polyethylene having an intrinsic viscosity value ranging from 1.5 to 4 dl/g and optionally containing recurring units derived from propylene in amounts lower than 10%.

The term "copolymer" as used herein refers to both polymers with two different recurring units and polymers with more than two different recurring units, such as terpolymers, in the chain. By "ambient temperature" is meant therein a temperature of about 25° C. (room temperature).

By the term "crystalline propylene polymer" is meant in the present application a propylene polymer having an amount of isotactic pentads (mmmm), measured by $^{13}$C-MNR on the fraction insoluble in xylene at 25° C., higher than 70 molar %; by "elastomeric" polymer is meant a polymer having solubility in xylene at ambient temperature higher than 50 wt %.

Typically the composition has a content of component (b) plus component (c) in amounts of 22 wt % or less, preferably 20 wt % or less, and a total content of copolymerized ethylene of at least 12 wt %, preferably ranging from 12 to 17 wt %.

The composition typically has a value of melt flow rate ranging from 1.5 to 5.0 g/10 min, preferably 1.8 to 3.0 g/10 min, more preferably 2.0 to 2.5 g/10 min.

The composition has typically an amount of polyethylene (c) roughly equal to elastomeric copolymer (b).

Typically, the composition of the present invention exhibits a flexural modulus value of at least 1400 MPa, preferably higher than 1500 MPa, even more preferably higher than 1600 MPa, such as from 1700 to 1900 MPa, a value of Izod impact resistance at 23° C. of more than 14 kJ/m$^2$, preferably more than 18 kJ/m$^2$, a value of Izod impact resistance at 0° C. of more than 6 kJ/m$^2$, preferably more than 7 kJ/m$^2$, and the one at −20° C. of at least 5 kJ/m$^2$.

Typically, the composition of the present invention exhibits a tensile strength at yield equal to or higher than 30 MPa, an elongation at yield equal to or higher than 5%, a tensile strength at break equal to or higher than 20 MPa, and an elongation at break equal to or higher than 14%.

Typically, the composition of the present invention exhibits an oxidation induction time (OIT), measured at 200° C., of more than 30 minutes, preferably more than 60 minutes, even more preferably more than 90 minutes.

Typically, the composition of the present invention shows a flexural creep strain, measured at 23° C. in the transverse direction on injection moulded samples, of less than 0.14%, preferably less than 0.13%, after 2 hours and less than 0.22%, preferably less than 0.20%, after 20 hours (under a load of 4 MPa). When the load is 10 MPa, the flexural creep strain is typically of less than 0.50%, preferably less than 0.40%, after 2 hours and less than 0.90%, preferably less than 0.80%, after 20 hours.

Crystalline propylene polymer (a) is selected from a propylene homopolymer and a copolymer of propylene containing at most 3 wt % of ethylene or a $C_4$-$C_{10}$ α-olefin or combination thereof. Particularly preferred is the propylene homopolymer.

Elastomeric ethylene-propylene copolymer (b) can optionally comprise a diene. When present, the diene is typically in amounts ranging from 0.5 to 10 wt % with respect to the weight of copolymer (b). The diene can be conjugated or not and is selected from butadiene, 1,4-hexadiene, 1,5-hexadiene, and ethylidene-norbornene-1, for example.

Copolymer (b) exhibits a fraction soluble in xylene at ambient temperature that is typically in amounts of less than 45 wt %, preferably equal to or lower than 25 wt %, even more preferably equal to or lower than 15 wt %. The xylene-insoluble polymer fraction of copolymer (b) is rich in ethylene; the amount of ethylene of copolymer (b) being typically lower than 50 wt %. Polyethylene (c) is crystalline or semi-crystalline and is selected from ethylene homopolymer or an ethylene-propylene copolymer having the average content of the comonomer in amounts lower than 10 wt %. The intrinsic viscosity values of copolymer (c) are preferably within the range of from 2.0 to 4.0 dl/g, more preferably of from 2.2 to 3.2 dl/g, even more preferably of from 2.5 to 3.0 dl/g.

The composition of the present invention is obtained by means of a sequential copolymerization process.

Therefore, the present invention is further directed to a process for the preparation of the polyolefin compositions as reported above, said process comprising at least three sequential polymerization stages with each subsequent polymerization being conducted in the presence of the polymeric material formed in the immediately preceding polymerization reaction, wherein the polymerization stage of propylene to the crystalline polymer (a) is carried out in at least one stage, then a copolymerization stage of mixtures of ethylene with propylene (and optionally a diene) to elastomeric polymer (b) and finally a polymerization stage of ethylene to polyethylene (c) are carried out. The polymerisation stages may be carried out in the presence of a stereospecific Ziegler-Natta catalyst.

According to a preferred embodiment, all the polymerisation stages are carried out in the presence of a catalyst comprising a trialkylaluminium compound, optionally an electron donor, and a solid catalyst component comprising a halide or halogen-alcoholate of Ti and an electron-donor compound supported on anhydrous magnesium chloride. Catalysts having the above-mentioned characteristics are well known in the patent literature; particularly advantageous are the catalysts described in U.S. Pat. No. 4,399,054 and EP-A-45 977. Other examples can be found in U.S. Pat. No. 4,472,524.

Preferably the polymerisation catalyst is a Ziegler-Natta catalyst comprising a solid catalyst component comprising:

a) Mg, Ti and halogen and an electron donor (internal donor), b) an alkylaluminum compound and, optionally (but preferably), c) one or more electron-donor compounds (external donor).

The internal donor is preferably selected from the esters of mono or dicarboxylic organic acids such as benzoates, malonates, phthalates and certain succinates. They are described in U.S. Pat. No. 4,522,930, European patent 45977 and international patent applications WO 00/63261 and WO 01/57099, for example. Particularly suited are the phthalic acid esters and succinate acids esters. Alkylphthalates are preferred, such as diisobutyl, dioctyl and diphenyl phthalate and benzyl-butyl phthalate.

Among succinates, they are preferably selected from succinates of formula (I) below:

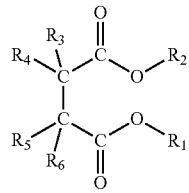

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$, equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from primary branched, secondary or tertiary alkyl groups, cycloalkyl, aryl, arylalkyl or alkylaryl groups having from 3 to 20 carbon atoms;

or of formula (II) below:

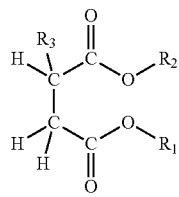

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms and the radical $R_3$ is a linear alkyl group having at least four carbon atoms optionally containing heteroatoms.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

External donor (c) can be of the same type or it can be different from the succinates of formula (I) or (II). Suitable external electron-donor compounds include silicon compounds, ethers, esters such as phthalates, benzoates, succinates also having a different structure from those of formula (I) or (II), amines, heterocyclic compounds and particularly 2,2,6,6-tetramethylpiperidine, ketones and the 1,3-diethers of the general formula (III):

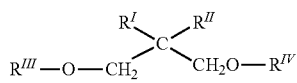

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Preferred electron-donor compounds that can be used as external donors include aromatic silicon compounds containing at least one Si—OR bond, where R is a hydrocarbon radical. A particularly preferred class of external donor compounds is that of silicon compounds of formula $R_a^7 R_b^8 Si(OR^9)_c$, where a and b are integer from 0 to 2, c is an integer from 1 to 3 and the sum (a+b+c) is 4; $R^7$, $R^8$, and $R^9$, are $C_1$-$C_{18}$ hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3-10 carbon atoms optionally containing heteroatoms and $R^9$ is a $C_1$-$C_{10}$ alkyl group, in particular methyl. Examples of such preferred silicon compounds are cyclohexyltrimethoxysilane, t-butyltrimethoxysilane, t-hexyltrimethoxysilane, cyclohexylmethyldimethoxysilane, 3,3,3-trifluoropropyl-2-ethylpiperidyl-dimethoxysilane, diphenyldimethoxysilane, methyl-t-butyldimethoxysilane, dicyclopentyldimethoxysilane, 2-ethylpiperidinyl-2-t-butyldimethoxysilane, (1,1,1-trifluoro-2-propyl)-methyldimethoxysilane and (1,1,1-trifluoro-2-propyl)-2-ethylpiperidinyldimethoxysilane. Moreover, are also preferred the silicon compounds in which a is 0, c is 3, $R^8$ is a branched alkyl or cycloalkyl group, optionally containing heteroatoms, and $R^9$ is methyl. Particularly preferred specific examples of silicon compounds are (tert-butyl)$_2$Si(OCH$_3$)$_2$, (cyclohexyl)(methyl) Si(OCH$_3$)$_2$, (phenyl)$_2$Si(OCH$_3$)$_2$ and (cyclopentyl)$_2$Si(OCH$_3$)$_2$.

Preferably electron donor compound (c) is used in such an amount to give a molar ratio between the organoaluminum compound and said electron donor compound (c) of from 0.1 to 500, more preferably from 1 to 300 and in particular from 3 to 100.

As explained above, the solid catalyst component comprises, in addition to the above electron donors, Ti, Mg and halogen. In particular, the catalyst component comprises a titanium compound, having at least a Ti-halogen bond, and the above mentioned electron donor compounds supported on a Mg halide. The magnesium halide is preferably MgCl$_2$ in active form, which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerisation of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are TiCl$_4$ and TiCl$_3$; furthermore, also Ti-haloalcoholates of formula Ti(OR)n-yXy can be used, where n is the valence of titanium, y is a number between 1 and n, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula Ti(OR)n-yXy, where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermally controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The electron donor compound(s) can be added during the treatment with TiCl$_4$.

Regardless of the preparation method used, the final amount of the electron donor compound(s) is preferably such that the molar ratio with respect to the MgCl$_2$ is from 0.01 to 1, more preferably from 0.05 to 0.5.

The said catalyst components and catalysts are described in WO 00/63261 and WO 01/57099. The catalysts may be pre-contacted with small quantities of olefin (prepolymerisation), maintaining the catalyst in suspension in a hydrocarbon solvent, and polymerising at temperatures from ambient to 60° C., thus producing a quantity of polymer from 0.5 to 3 times the weight of the catalyst. The operation can also take place in liquid monomer, producing, in this case, a quantity of polymer 1000 times the weight of the catalyst.

By using the above mentioned catalysts, the polyolefin compositions are obtained in spheroidal particle form, the particles having an average diameter from about 250 to 7,000 microns, a flowability of less than 30 seconds and a bulk density (compacted) greater than 0.4 g/ml.

The polymerisation stages may occur in liquid phase, in gas phase or liquid-gas phase. Preferably, the polymerisation of crystalline polymer (a) is carried out in liquid monomer (e.g. using liquid propylene as diluent), while the copolymerisation stages of elastomeric copolymer (b) and polyethylene (c) are carried out in gas phase. Alternatively, all the three sequential polymerisation stages can be carried out in gas phase.

The reaction temperature in the polymerisation stage for the preparation of crystalline polymer (a) and in the preparation of elastomeric copolymer (b) and polyethylene (c) be the same or different, and is preferably from 40 to 100° C.; more preferably, the reaction temperature ranges from 50 to 80° C. in the preparation of polymer (a), and from 70 to 100° C. for the preparation of polymer components (b) and (c).

The pressure of the polymerisation stage to prepare polymer (a), if carried out in liquid monomer, is the one which competes with the vapor pressure of the liquid propylene at the operating temperature used, and it may be modified by the vapor pressure of the small quantity of inert diluent used to feed the catalyst mixture, by the overpressure of optional monomers and by the hydrogen used as molecular weight regulator.

The polymerisation pressure preferably ranges from 33 to 43 bar, if done in liquid phase, and from 5 to 30 bar if done in gas phase. The residence times relative to the two stages depend on the desired ratio between polymers (a) and (b) and (c), and can usually range from 15 minutes to 8 hours. Conventional molecular weight regulators known in the art, such as chain transfer agents (e.g. hydrogen or ZnEt$_2$), may be used.

Conventional additives, fillers and pigments, commonly used in olefin polymers, may be added, such as nucleating agents, extension oils, mineral fillers, and other organic and inorganic pigments. In particular, the addition of inorganic fillers, such as talc, calcium carbonate and mineral fillers, also brings about an improvement to some mechanical properties, such as flexural modulus and HDT. Talc can also have a nucleating effect.

The nucleating agents are added to the compositions of the present invention in quantities ranging from 0.05 to 2% by weight, more preferably from 0.1 to 1% by weight, with respect to the total weight, for example.

The polypropylene composition object of the present invention can be advantageously used for obtaining underground water management system articles if blended with small quantities of 1-butene based polymers. The resulting blend is endowed with improved processability and at the same time the mechanical properties are substantially retained. Therefore a further object of the present invention is a polymer composition comprising (percent by weight):

A) From 99% to 80%; preferably from 98% to 85%; more preferably from 98% to 90% of a polypropylene composition comprising: (percent by weight):
  a) 78-84%, preferably 78 to 82%, of a crystalline propylene polymer having an amount of isotactic pentads (mmmm), measured by $^{13}$C-MNR on the fraction insoluble in xylene at 25° C., higher than 97.5 molar % and a polydispersity index ranging from 3 to 8;
  b) 8 to less than 13%, preferably 9 to less than 12%, of an elastomeric copolymer of ethylene and propylene, the copolymer having an amount of recurring units deriving from ethylene ranging from 30 to 70%, preferably 35 to 60%, and being partially soluble in xylene at ambient temperature; the polymer fraction soluble in xylene at ambient temperature having an intrinsic viscosity value ranging from 2 to 4 dl/g;
  c) 8 to less than 13%, preferably 9 to less than 12%, of polyethylene having an intrinsic viscosity value ranging from 1.5 to 4 dl/g and optionally containing recurring units derived from propylene in amounts lower than 10%; and B) From 1% to 20%; preferably from 2% to 85%; more preferably from 2% to 10% of a crystalline polybutene-1.

Component A) and subcomponents a), b) and c) have been described above.

The crystalline polybutene-1 is defined has having a melting point higher than 90° C.; preferably it is higher than 100° C.; more preferably it is higher than 110° C.; even more preferably it is comprised between 110° C. and 140° C.

The crystalline polybutene-1 used as component (B) of the composition of the invention can be any of the polybutene-1, homo or copolymer with other olefins, having a predominantly isotactic structure and a 1-butene derived units content ranging from 100% to 80% by mol; preferably from 100% to 90% by mol; more preferably from 100% to 95% by mol, even more preferably 1-butene homopolymer are used. Such polymers are known in the art. The isotactic polybutene-1 (co)polymers can be prepared by polymerizing butene-1 in the presence of $TiCl_3$ based catalyst components together with alkylaluminum halides (such as diethylaluminum chloride—DEAC) as cocatalyst. Polybutene-1 (co)polymers can also be obtained by polymerizing the monomers in the presence of a stereospecific catalyst comprising (a) a solid component comprising a Ti compound and an electron-donor compound supported on $MgCl_2$; (b) an alkylaluminum compound and, optionally, (c) an external electron-donor compound. A process of this type is disclosed for example in EP-A-017296. Preferably the polybutene-1 used has an isotacticity (expressed in terms of pentads mmmm %) higher than 80%, more preferably higher than 85%, and still more preferably higher than 90%.

The melt flow rate (MFR 190° C./2.16 kg) is generally comprised in the range of from 1 g/10 min to 500 g/10 min, preferably of from 5 g/10 min to 300 g/10 min and more preferably from 10 g/10 min to 20 g/10 min or from 150 g/10 min to 200 g/10 min. When a butene copolymer with one or more other olefins is used, the olefin can be selected preferably from the group consisting of ethylene, propylene, pentene-1, hexene-1 and octene-1. Particularly preferred are the random copolymer with ethylene or propylene containing up to 20% by weight of units deriving from ethylene or propylene or both.

The particulars are given in the following examples, which are given to illustrate, without limiting, the present invention.

EXAMPLES

The following analytical methods have been used to determine the properties reported in the detailed description and in the examples.

Ethylene: By IR spectroscopy.

The spectrum of a pressed film of the polymer is recorded in absorbance vs. wavenumbers ($cm^{-1}$). The following measurements are used to calculate C2 content:

a) Area ($A_t$) of the combination absorption bands between 4482 and 3950 $cm^{-1}$ which is used for spectrometric normalization of film thickness.

b) Area ($A_{C2}$) of the absorption band due to methylenic sequences ($CH_2$ rocking vibration) after a proper digital subtraction of an isotactic polypropylene (IPP) reference spectrum. The range 660 to 790 $cm^{-1}$ is used for both heterophasic and/or random copolymers The comonomer content of the Component B is determined on the precipitated "amorphous" fraction of the polymer. The precipitated "amorphous" fraction is obtained as follows: to one 100 ml aliquot of the filtered liquid obtained as described above (procedure for the Xylene-soluble faction) 200 ml of acetone are added under vigorous stirring. Precipitation must be complete as evidenced by a clear solid-solution separation. The solid thus obtained is filtered on a tared metallic screen and dried in a vacuum oven at 70° C. until a constant weight is reached.

Melting Temperatures for Polybutene-1

The melting point of polybutene-1 were determined by Differential Scanning calorimetry (D.S.C.) on a Perkin Elmer DSC-7 instrument. The melting temperatures of butene-1 homo and co-polymers were determined according to the following method:

TmII (measured in second heating run): a weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites thus cancelling the thermal history of the sample. Successively, after cooling to −20° C. with a scanning speed corresponding to 10° C./minute, the peak temperature was taken as crystallization temperature (Tc). After standing 5 minutes at −20° C., the sample was heated for the second time at 200° C. with a scanning speed corresponding to 10° C./min. In this second heating run, the peak temperature when present was taken as the melting temperature of the polybutene-1 (PB) crystalline form II (TmII) and the area as global melting enthalpy (ΔHfII).

The melting enthalpy after 10 days and the melting temperature of crystalline form I (TmI) was measured as follows by using the Differential Scanning calorimetry (D.S.C.) on an Perkin Elmer DSC-7 instrument: A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. The sample was then stored for 10 days at room temperature. After 10 days the sample was subjected to DSC, it was cooled to −20° C., and then it was heated at 200° C. with a scanning speed corresponding to 10° C./min. In this heating run, the first peak temperature coming from the lower temperature side in the thermogram was taken as the melting temperature (TmI), and the area as global melting enthalpy after 10 days (ΔHf), when this was the only peak observed.

Fractions soluble and insoluble in xylene at 25° C.: 2.5 g of polymer are dissolved in 250 mL of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble at room temperature (25° C.).

Intrinsic Viscosity [η]: Measured in tetrahydronaphthalene at 135° C.

Determination of isotactic pentads content: 50 mg of each xylene insoluble fraction were dissolved in 0.5 mL of $C_2D_2Cl_4$ The $^{13}C$ NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference.

The microstructure analysis was carried out as described in literature (Polymer, 1984, 25, 1640, by Inoue Y. et Al. and Polymer, 1994, 35, 339, by Chujo R. et Al.).

Polydispersity index: Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

Melt flow rate: Determined according to ISO method 1133 (230° C. and 2.16 kg) for polybutene the melt flow rate has been determined according to ISO method 1133 with condition 190° C./2.16 kg.

Flexural modulus and other flexural stress/strain properties: Determined according to ISO method 178.

Izod impact resistance: Determined according to ISO method 180/1A.

Oxidation induction time (OIT) (200° C.): Determined according to EN method 728.

Flexural creep: Samples were cut from injection moulded plaques 3.2 mm thick. The shape of the samples is rectangular, 12.7×120 mm and support span is 60 mm. The test is performed with three-point bending in a conditioning oven able to guarantee an imposed temperature of +/−1° C. Load is applied in the transverse direction (i.e. the direction perpendicular to the flow direction) or longitudinal direction by a cylindrical pad having a diameter of 10 mm. Displacement of the same pad is recorded by means of digital gauge having a precision of 0.01 mm. The test was carried out at a temperature of 23° C.

Spiral Test is carried out using an injection molding apparatus with a spiral mould and pressure of 1350 bar
screw diameter: 35 mm
max. piston displacement: 150 cm3
spec. injection pressure: 1350 bar
temperature in zone 2/zone 3/zone 4/zone 5: 200° C./195° C./190° C./185° C.
injection cycle: injection time including holding: 15 s
cooling time: 15 s
injection pressure: Follows from the predetermined length of the testing material.
dwell pressure=injection pressure
screw speed: 30 rpm
system pressure: 160 bar
metering path: Metering stroke should be set so the screw stops 20 mm before final position
by end of the holding pressure.[L]
tool temperature: 40° C.
The spiral flow length can be determined immediately after the injection operation.

Examples 1 and 2

In a plant operating continuously according to the mixed liquid-gas polymerization technique, runs were carried out under the conditions specified in Table 1.

The polymerization was carried out in the presence of a catalyst system in a series of three reactors equipped with devices to transfer the product from one reactor to the one immediately next to it.

Preparation of the Solid Catalyst Component

Into a 500 ml four-necked round flask, purged with nitrogen, 250 ml of $TiCl_4$ are introduced at 0° C. While stirring, 10.0 g of microspheroidal $MgCl_2 \cdot 1.9C_2H_5OH$ (prepared according to the method described in ex.2 of U.S. Pat. No. 4,399,054 but operating at 3000 rpm instead of 10000 rpm) and 9.1 mmol of diethyl 2,3-(diisopropyl)succinate are added. The temperature is raised to 100° C. and maintained for 120 min. Then, the stirring is discontinued, the solid product was allowed to settle and the supernatant liquid is siphoned off. Then 250 ml of fresh $TiCl_4$ are added. The mixture is reacted at 120° C. for 60 min and, then, the supernatant liquid is siphoned off. The solid is washed six times with anhydrous hexane (6×100 ml) at 60° C.

Catalyst System and Prepolymerization Treatment

The solid catalyst component described above was contacted at 12° C. for 24 minutes with aluminium triethyl (TEAL) and dicyclopentyldimethoxysilane (DCPMS) as outside-electron-donor component. The weight ratio between TEAL and the solid catalyst component and the weight ratio between TEAL and DCPMS are specified in Table 1.

The catalyst system is then subjected to prepolymerization by maintaining it in suspension in liquid propylene at 20° C. for about 5 minutes before introducing it into the first polymerization reactor.

Polymerization

The polymerisation run is conducted in continuous in a series of three reactors equipped with devices to transfer the product from one reactor to the one immediately next to it. The first reactor is a liquid phase reactor, and the second and third reactors are fluid bed gas phase reactors. Polymer (a) is prepared in the first reactor, while polymers (b) and (c) are prepared in the second and third reactor, respectively.

Temperature and pressure are maintained constant throughout the course of the reaction. Hydrogen is used as molecular weight regulator.

The gas phase (propylene, ethylene and hydrogen) is continuously analysed via gas-chromatography.

At the end of the run the powder is discharged and dried under a nitrogen flow.

Then the polymer particles are introduced in a twin screw extruder (Werner-type extruder), wherein they are mixed with 635 ppm of Irganox 1010, 635 ppm of Irgafos 168, 2450 ppm of distearyl thio-diproprionate and 270 ppm of synthetic hydrotalcite. The previously said Irganox 1010 is pentaerytrityl tetrakis 3-(3,5-di-tert-butyl-4-hydroxyphenyl) propanoate, while Irgafos 168 is tris(2,4-di-tert-butylphenyl) phosphite, both marketed by Ciba-Geigy. The polymer particles are extruded under nitrogen atmosphere in a twin screw extruder, at a rotation speed of 250 rpm and a melt temperature of 200-250° C.

Comparative Example 1 (1c)

Example 1 was repeated under the conditions specified in Table 1, except that the catalyst component was replaced with a catalyst component containing diisobutylphthalate in the place of diethyl 2,3-(diisopropyl)succinate.

TABLE 1

Polymerization Process

| | EXAMPLE | | |
|---|---|---|---|
| | 1 | 2 | 1C |
| TEAL/DCPMS weight ratio | 10 | 4 | 4 |
| $1^{st}$ liquid phase reactor | | | |
| Polymerisation temperature, ° C. | 75 | 75 | 75 |
| Pressure, bar | 39 | 40 | 40 |
| $H_2$ bulk, mol ppm | 1200 | 1300 | 1350 |
| $1^{st}$ gas phase reactor | | | |
| Polymerisation temperature, ° C. | 70 | 70 | 70 |
| Pressure, bar | 12 | 12 | 12 |
| $C_2^-/(C_2^- + C_3^-)$, % | 0.33 | 0.39 | 0.39 |
| $H_2/C_2^-$, % | 0.035 | 0.034 | 0.035 |
| $2^{ns}$ gas phase reactor | | | |
| Polymerisation temperature, ° C. | 95 | 95 | 95 |
| Pressure, bar | 12 | 12 | 12 |
| $C_2^-/(C_2^- + C_3^-)$, % | 0.97 | 0.98 | 0.96-0.99 |
| $H_2/C_2^-$, % | 0.1 | 0.1 | 0.15 |

Notes:
$H_2$ bulk = hydrogen concentration in the liquid monomer;
$C_2^-$ = ethylene;
$C_3^-$ = propylene.

TABLE 2

Composition Analysis

|  | EXAMPLE | | |
|---|---|---|---|
|  | 1 | 2 | 1C |
| Crystalline propylene homopolymer | | | |
| Homopolymer content, wt % | 80 | 80.5 | 70.3 |
| MFR, g/10 min | 3.3 | 4 | 3.9 |
| Polydispersity Index | 5.7 | 5.8 | 4.5 |
| Pentad content, molar % | 98 | 98.5 | 98.5 |
| Xylene soluble fraction, wt % | 1.5 | 1.5 | 1.6 |
| Proylene-ethylene copolymer | | | |
| Copolymer content, wt % | 10 | 10 | 11.7 |
| Ethylene content in EPR, % | 47 | 47 | 55 |
| Intrinsic viscosity [η] of the xylene-soluble fraction, dl/g | 3.5 | 3.6 | 3.6 |
| Xylene soluble fraction, wt % | 10.5$^{(1)}$ | 10$^{(1)}$ | 10.5$^{(1)}$ |
| Polyethylene | | | |
| Polyethylene content, wt % | 10 | 9.5 | 18 |
| Ethylene content in PE, wt % | 100 | 100 | 100 |
| Intrinsic viscosity [η], dl/g | 2.7 | 2.7 | 2.7 |

Notes:
EPR: elastomeric ethylene-propylene copolymer rubber;
PE: crystalline polyethylene.
$^{(1)}$Value measured on the polymer composition produced in the first and second reactor.

The properties of the final compositions are recorded in Table 3.

TABLE 3

Properties of the final compositions

|  |  | EXAMPLES AND COMPARATIVE EXAMPLES | | |
|---|---|---|---|---|
|  |  | 1 | 2 | 1C |
| Ethylene content, wt % | | 16 | 15 | 22.4 |
| MFR, g/10 min | | 2.3 | 2.2 | 2.0 |
| Flexural Modulus, MPa | | 1770 | 1830 | 1504 |
| Tensile Strength at yield, MPa | | 30.4 | 30.8 | 26.6 |
| Elongation at yield, % | | 5.5 | 5.0 | 6.1 |
| Tensile Strength at break, MPa | | 21.3 | 25.0 | 16.4 |
| Elongation at break, % | | 16 | 14 | 21.0 |
| Oxidation induction time (OIT) (200° C.), min | | 92 | 94 | 20 |
| Izod impact resistance, kJ/m² | at 23° C. | 26 | 19 | 46 |
|  | at 0° C. | 10.4 | 7.8 | 11.2 |
| Flexural Creep Strain (%); Load of 4 MPa | after 2 hours | 0.12 | 0.11 | 0.14 |
|  | after 20 hours | 0.19 | 0.17 | 0.22 |
| transverse direction | | | | |
| Flexural Creep Strain (%); Load of 10 MPa transverse direction | after 2 hours | 0.37 | 0.37 | 0.54 |
|  | after 20 hours | 0.63 | 0.74 | 0.92 |

The above data show that the polymer compositions according to the present invention exhibit an improved balance between high thermo-oxidative stability, sufficient flow properties, high flexural modulus, good creep resistance and good impact strength.

Examples 4-7

The polymer of example 2 have been blended with 2 different samples of crystalline homopolymer of butene-1 sold by Lyondellbasell under the names PB0801M (PB) and DP0401M (DP). The characteristics of these polymers are reported on table 4. The obtained compositions have been characterized, the results have been reported on table 5.

TABLE 4

|  |  | PB0801M | DP0401M |
|---|---|---|---|
| Melt flow rate (MFR) (190° C./2.16 kg) | g/10 min | 200 | 15 |
| TmI | ° C. | 126 | 126 |

TABLE 5

| Ex |  | 2 | 4 | 5 | 6 | 7 |
|---|---|---|---|---|---|---|
| Polybutene-1 |  |  | PB | PB | DP | DP |
| Amount of Polybutene-1 | % wt | 0 | 3 | 7 | 3 | 7 |
| MFR (230° C./2.16 kg) | g/10 min | 2.3 | 2.3 | 2.9 | 2.2 | 2.5 |
| Izod impact resistance, −20° C. | kJ/m² | 5.9 | 5.2 | 5.3 | 5.7 | 5.3 |
| Tm | ° C. | 163.9 | 163.8 | 163.5 | 163.7 | 163.8 |
| Spiral test | cm | 31.2 | 37.2 | 39.4 | 38.8 | 40.3 |
| Flexural Creep Strain (%); Load of 4 MPa | after 20 hours | 0.25 |  |  |  |  |
| Longitudinal direction |  |  | 0.25 | 0.23 | 0.23 | 0.26 |

ON table 5 it is shown that the addiction of polybutene-1 improves the flowablity (spiral test values) while the mechanical properties are about the same

The invention claimed is:
1. A polymer composition comprising:
(A) 80 to 99 wt. %, based upon the total weight of the polymer composition, of a polypropylene composition which comprises:
  a) 78-84 wt. %, based upon the total weight of the polypropylene composition, of a crystalline propylene polymer, wherein the crystalline propylene polymer has:
   (i) isotactic pentads (mmmm) present in an amount higher than 97.5 molar %, as measured by $^{13}$C-MNR based upon a fraction of the crystalline propylene polymer that is insoluble in xylene at 25° C., and a polydispersity index ranging from 3 to 8;
  b) 8 to less than 13 wt. %, based upon the total weight of the polypropylene composition, of an elastomeric copolymer, wherein the elastomeric copolymer comprises ethylene and propylene derived units, wherein the ethylene derived units are present in an amount ranging from 30 to 70 wt. %, and wherein the elastomeric copolymer is partially soluble in xylene at ambient temperature, wherein the fraction of the elastomeric polymer that is soluble in xylene at ambient temperature has an intrinsic viscosity value ranging from 2 to 4 dl/g; and c) 8 to less than 13 wt. %, based upon the total weight of the polypropylene composition, of a polyethylene, wherein the polyethylene has:
  (i) an intrinsic viscosity ranging from 1.5 to 4 dl/g, and
  (ii) optionally, contains propylene derived units in an amount lower than 10 wt. %,
wherein the polypropylene composition has:
  (i) a flexural modulus value higher than 1400 MPa, as measured according to ISO method 178,
  (ii) a melt flow rate (MFR), determined according to ISO method 1133 (230° C. and 2.16 kg), of from 1.5 to 5.0 g/10 min, and
  (iii) a value of Izod impact resistance at 0° C. of more than 6 kJ/m$^2$ according to ISO method 180/1A;

(B) 1 to 20 wt. %, based upon the total weight of the polymer composition, of a crystalline polybutene-1.

2. The polymer composition according to claim 1 wherein the polypropylene composition comprises:
  a) 78 to 82 wt. % of the crystalline polypropylene;
  b) 9 to less than 12 wt. % of the elastomeric copolymer; and
  c) 9 to less than 12 wt. % of the polyethylene.

3. The polymer composition according to claim 1 wherein the crystalline polybutene-1 is a 1-butene homopolymer.

4. The polymer composition of claim 1 wherein the polypropylene composition (A) has a flexural modulus value higher than 1500 MPa.

5. An article comprising a polymer composition, wherein the polymer composition comprises:
  (A) 80 to 99 wt. %, based upon the total weight of the polymer composition, of a polypropylene composition which comprises:
    a) 78-84 wt. %, based upon the total weight of the polypropylene composition, of a crystalline propylene polymer, wherein the crystalline propylene polymer has:
      (i) isotactic pentads (mmmm) present in an amount higher than 97.5 molar %, as measured by $^{13}$C-MNR based upon a fraction of the crystalline propylene polymer that is insoluble in xylene at 25° C., and a polydispersity index ranging from 3 to 8;
    b) 8 to less than 13 wt. %, based upon the total weight of the polypropylene composition, of an elastomeric copolymer, wherein the elastomeric copolymer comprises of ethylene and propylene derived units, wherein the ethylene derived units are present in an amount ranging from 30 to 70 wt. %, and wherein the elastomeric copolymer is partially soluble in xylene at ambient temperature, wherein the fraction of the elastomeric polymer that is soluble in xylene at ambient temperature has an intrinsic viscosity value ranging from 2 to 4 dl/g; and
    c) 8 to less than 13 wt. %, based upon the total weight of the polypropylene composition, of a polyethylene, wherein the polyethylene has:
      (i) an intrinsic viscosity ranging from 1.5 to 4 dl/g, and
      (ii) optionally, contains propylene derived units in an amount lower than 10 wt. %,
    wherein the polypropylene composition has:
      (i) a flexural modulus value higher than 1400 MPa, as measured according to ISO method 178,
      (ii) a melt flow rate (MFR), determined according to ISO method 1133 (230° C. and 2.16 kg), of from 1.5 to 5.0 g/10 min, and
      (iii) a value of Izod impact resistance at 0° C. of more than 6 kJ/m$^2$ according to ISO method 180/1A;
  (B) 1 to 20 wt. %, based upon the total weight of the polymer composition, of a crystalline polybutene-1.

6. The article of claim 5, wherein the article is an injection-molded article made by injection-molding the polymer composition.

7. The article of claim 6, wherein the article is an infiltration unit.

8. The article of claim 7, wherein the infiltration unit is present in an underground water management system.

* * * * *